United States Patent Office 2,708,679
Patented May 17, 1955

2,708,679

THIOURONIUM PENTACHLOROPHENATES

Chien-Pen Lo and W E Craig, Philadelphia, Pa., assignors to Rohm & Haas Company, Philadelphia, Pa., a corporation of Delaware No Drawing. Application May 25, 1954,
Serial No. 432,320

6 Claims. (Cl. 260—564)

This invention concerns thiouronium pentachlorophenates of the structure

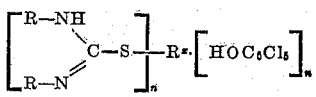

wherein $n$ is an integer having a value of one to two, $R^x$ is an alkyl or alkenyl group of not over 18 carbon atoms or an aralkyl group when $n$ is one or when $n$ is two, a divalent group joining two thiouronium groups through linkages to sulfur atoms, particularly an alkylene or alkenylene group of two to four carbon atoms, and R represents hydrogen or a lower alkyl group (from methyl to butyl) when taken individually or when taken together, the two R's form an ethylene or propylene group which with the

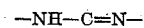

grouping forms a heterocycle.

The compounds of this invention are prepared by mixing a thiouronium halide

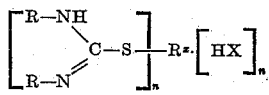

where X is chlorine or bromine and an alkali metal salt of pentachlorophenol in an inert organic solvent or water, effecting reaction, and separating alkali metal halide and the thiouronium pentachlorophenate.

The reaction, which involves equivalent proportions of alkali metal pentachlorophenate and thiouronium halide, is effected between 0° and 125° C. in water or in an inert solvent such as acetone, aqueous methanol, ethanol, isopropyl alcohol, or dioxane. The preferred solvent is water. Water can also be used to dissolve out the halide salt which is formed by metathesis. Product and salt are separated, as by filtering off salt from an organic solvent solution or by separating product from an aqueous salt solution by filtering, extracting, or decanting.

The thiouronium halides, which may be used, include hydrohalides of such compounds as S-methylisothiourea, S-butylisothiourea, S-n-octylisothiourea, S - isooctylisothiourea, S-dodecylisothiourea, S-allylisothiourea, S-octenylisothiourea, S-dodecenylisothiourea, S-cetylisothiourea, S-octadecylisothiourea, S-benzylisothiourea, S-butylbenzylisothiourea, S-chlorobenzylisothiourea, N,N'-dimethyl-S-methylisothiourea, N,N'-dimethyl-S-octylisothiourea, N,N'-dimethyl-S-dodecylisothiourea, N,N'-dimethyl - S-octadecylisothiourea, N,N'-dimethyl - S - dodecenylisothiourea, N,N' - dibutyl-S-methylisothiourea, N,N'-dibutyl-S-hexylisothiourea, - N,N'-dibutyl-S-2-ethylhexylisothiourea, N,N'-dibutyl-S-allylisothiourea, N,N'-dibutyl-S-dodecenylisothiourea, N,N'-dibutyl-S-benzylisothiourea, S-methyl-N,N'-ethyleneisothiourea, S-benzyl-N,N'-ethyleneisothiourea, S-dodecenyl-N,N'-ethyleneisothiourea, S-cetyl-N,N'-ethyleneisothiourea, S-cetyl-N,N'-(1,2-propylene)isothiourea, S - benzyl-N,N'-(1,2-propylene)-isothiourea, S - dodecenyl-N,N'-(1,2-propylene)isothiourea, and the like. When alkylene or alkenylene bis thiouronium hydrohalides are at hand these may be such hydrohalides as those of S,S'-ethylene bis isothiourea, S,S'-ethylene bis(N,N'-dimethylisothiourea), S,S'-ethylene bis(N,N'-dibutylisothiourea,), S,S'-ethylene bis(N,N'-ethylene isothiourea), S,S'-1,2-propylene bisisothiourea, S,S'-tetramethylene bis(N,N'-ethyleneisothiourea), S,S'-1,4-but-2-enylene bis(N,N'-dimethylisothiourea), S,S'-1,4-but-2-enylene bis(N,N'-dibutylisothiourea), S,S'-1,4-but-2-enylene bis(N,N'-propyleneisothiourea), S,S'-1,2-but-3-enylene bisisothiourea.

Typical preparations of thiouronium pentachlorophenates are described in the following illustrative examples. Parts therein are by weight.

Example 1

S-cetyl-N,N'-dimethylthiouronium bromide (20 parts) was dissolved in water (600 parts). To this was added a solution of sodium pentachlorophenate (17 parts) in water (200 parts). Oil which separated solidified upon cooling. This was collected, washed with water, and air dried. This was S-cetyl-N,N'-dimethylthiouronium pentachlorophenate (27 parts) having a melting point of 95–98°. Analysis:—Calcd. for $C_{25}H_{41}Cl_5N_2OS$: N, 4.7; Found: N, 4.5.

This compound was found to be an effective herbicide. Phytotoxicity tests were made with tomato plants, which were sprayed with dilute suspensions of this compound at various concentration levels. Readings were made after seven days. Results were as follows: At 1% and 0.1% plants were dead; at 0.01% definite phytocidal effects were observed. Tests were also made with bean plants. At 8 lbs./100 gallons all plants were dead.

Example 2

S - (3,4 - dichlorobenzyl)thiouronium chloride (163 parts) was dissolved in hot water (6000 parts). To this was added a solution of sodium pentachlorophenate (200 parts) in water (1500 parts). Heavy oil separated out which solidified to a light brown resinous mass on standing. The latter was separated and washed with water by decantation. This product became a semi-solid and was identified as S-(3,4-dichlorobenzyl)thiouronium pentachlorophenate (294 parts). Analysis:—Calcd. for $C_{14}H_9Cl_7N_2OS$: N, 5.6; Found: N, 5.6.

Phytotoxicity tests with tomato plants gave the following data: At 1% of compound, effects severe (dead); at 0.1%, moderate; and at 0.01%, slight. On bean plants the compound tested at 8 lbs./100 gal. gave severe injury.

Example 3

S,S' - (1,4 - but - 2 - enylene) - 1,4 - bis - (N,N'-ethylene)-thiouronium chloride (20 parts) was dissolved in water (100 parts). This was added to a solution of sodium pentachlorophenate (40 parts) in water (600 parts). White precipitate formed immediately. The solid was collected, washed with water and air dried. The product (45 parts), a white solid which melted at 182° C. corresponded in composition to S,S'-(1,4-but-2-enylene) - bis - (N,N' - ethylenethiouronium pentachlorophenate). Analysis:—Calcd. for $C_{22}H_{18}Cl_{10}N_4O_2S_2$: N, 7.1; Found: N, 7.1.

Phytotoxicity tests with tomato plants gave the following data: At 1% of compound, severe (dead) effects; at 0.1%, moderate; and at 0.01%, slight. On bean plants the compound tested at 8 lbs./100 gal. gave severe damage.

Example 4

S-cetylthiouronium bromide (20 parts) was dissolved in a mixture of ethanol (100 parts) and water (100 parts). This was added to a solution of sodium pentachlorophenate (20 parts) in water (400 parts). The solid precipitate which formed was collected, washed with water, and air dried. This was S-cetyl-thiouronium pentachlorophenate (31 parts). It had a melting point of 108–110°. Analysis:—Calcd. for $C_{23}H_{37}Cl_5N_2OS$: N, 5.0; Found: N, 5.0.

Phytotoxicity tests with tomato plants showed that at 1% all plants were dead.

Example 5

S-octadecyl-N,N'-dimethylthiouronium bromide (22 parts) was dissolved in a mixture of ethanol (500 parts). To this was added a solution of sodium pentachlorophenate (15 parts) in water (300 parts). The mixture became turbid but no solid separated out. Water (1000 parts) was added and the mixture was cooled. The solid which separated was collected, washed with water, and air dried. This was S-octyldecyl-N,N'-dimethylthiouronium pentachlorophenate (30.5 parts). It had a melting point of 84–87°. Analysis:—Calcd. for $C_{27}H_{45}Cl_5N_2OS$:

N, 4.5; Found: N, 4.0.

Phytotoxicity tests with tomato plants showed that at 1% all plants were killed; at 8 lbs./100 gal. moderate damage was caused on bean plants.

Example 6

S - (3,4 - dichlorobenzyl) - N,N' - dimethylthiouronium chloride (15 parts) was dissolved in water (300 parts). To this was added a solution of sodium pentachlorophenate (20 parts) in water (400 parts). White precipitate formed immediately. The solid was collected, washed with water, and air dried. This was S-(3,4-dichlorobenzyl-N,N'-dimethylthiouronium pentachlorophenate (25 parts) which had a melting point of 124–128°. Analysis:—Calcd. for $C_{16}H_{13}Cl_7N_2OS$: N, 5.3; Found: N, 5.0.

Phytotoxicity tests with tomato plants showed that at 1% damage was severe (dead). Tests on bean plants at 8 lbs./100 gal. showed severe damage.

Example 7

S - (3,4 - dichlorobenzyl) - N,N' - ethylenethiouronium chloride (135 parts) was dissolved in hot water (3000 parts). To this was added a solution of sodium pentachlorophenate (170 parts) in water (1500 parts). Oil separated out which solidified upon cooling. The solid was collected, washed with water and dried in an oven at 100°. This was S-(3,4-dichlorobenzyl)-N,N'-ethylenethiouronium pentachlorophenate (225 parts). It had a melting point of 168–172°. Analysis:—Calcd. for $C_{16}H_{11}Cl_7N_2OS$: N, 5.3; Found: N, 5.3.

Phytotoxicity tests with tomato plants showed that at 1%, moderate damage resulted. On bean plants at 8 lbs./100 gal. damage was severe.

Example 8

S,N,N'-tri-n-butylthiouronium bromide (16 parts) was dissolved in water (300 parts). To this was added a solution of sodium pentachlorophenate (15 parts) in water (100 parts). The oil which separated was taken up in benzene, dried over sodium sulfate, and stripped under reduced pressure. The residue (24 parts) was a very viscous oil which was the S,N,N'-tri-n-butylthiouronium pentachlorophenate. It exhibits definite herbicidal action.

Example 9

S-benzyl-N,N'-ethylenethiouronium chloride (57 parts) was dissolved in water (700 parts). This solution was added to a solution of sodium pentachlorophenate (72 parts) in water (500 parts). A solid formed and was collected by filtering, washed with water, and air dried. There was obtained 102 parts of S-benzyl-N,N'-ethylenethiouronium pentachlorophenate, melting at 155°–157° C.

Tests of this compound on tomatoes showed that it was powerfully phytotoxic on tomatoes, the test plants being dead within seven days after application of a 1% spray. Severe phytotoxicity was found when a 1% spray of this compound was applied on bean plants.

Example 10

S-allythiouronium chloride (30 parts) was dissolved in water (400 parts). This was added to a solution of sodium pentachlorophenate (58 parts) in water (500 parts). The oil which separated became a semi-solid mass. It was separated and washed with water by decantation. There was obtained 61 parts of S-allylthiouronium pentachlorophenate.

Phytotoxicity tests with a 1% spray on bean plants showed severe effects, and also on tomato plants, these being dead within seven days.

Example 11

S-methylthiouronium chloride (12.5 parts) was dissolved in water (150 parts). To this was added a solution of sodium pentachlorophenate (29 parts) in water (300 parts). The solid which separated was collected, washed with water and dried. The S-methylthiouronium pentachlorophenate (30 parts) had a melting point of 104–106° C. This compound was also found severely phytotoxic.

Example 12

S-n-octyl-N,N' - (1,2 - propylene)thiouronium bromide (31 parts) was dissolved in water (500 parts). This was added to a solution of sodium pentachlorophenate (29 parts) in water (400 parts). There was obtained 46 parts of S-n-octyl-N,N' - (1,2 - propylene)thiouronium pentachlorophenate. This compound is highly phytotoxic to both tomato and bean plants.

Example 13

S,S' - ethylenebis - (N,N' - dimethylthiouronium) bromide (20 parts) was dissolved in water (300 parts). This was added to a solution of sodium pentachlorophenate (29 parts) in water (300 parts). There was obtained 35 parts of S,S'-ethylenebis-(N,N'-dimethylthiouronium)pentachlorophenate. This compound melts at 148°–150° C.

Phytotoxicity tests on tomatoes showed that a 1% spray caused severe damage, the plants being dead within seven days, and the damage at 0.1% being moderate. Sprays with 8 lbs. of this compound per 100 gal. caused severe phytotoxicity.

The thiouronium pentachlorophenates of this invention can be used as rapid acting herbicides. For this purpose they may be prepared in the form of dusts or powders, one or more of these pentachlorophenates being taken up in a finely-divided solid carrier, such as talc, clay, bentonite, pyrophyllite, chalk, diatomaceous earth, or the like. Concentrations from 1% to 20% may be so used. Solvent solutions may also be prepared. Water-miscible solvents such as acetone or dioxane can be made and used by adding them to water and spraying the resulting mixture. The pentachlorophenates may also be taken up in such a solvent as kerosene, xylene, or methylated naphthalenes. To these solutions emulsifying agents can be added to provide self-emulsifying concentrates for preparation of aqueous sprays.

We claim:

1. Compounds of the structure

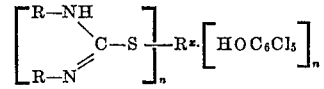

where $n$ is an integer from one to two, $R^x$ is a member of the class consisting of alkyl and alkenyl groups of not over 18 carbon atoms and the benzyl group when $n$ is one and when $n$ is two, alkylene and alkenylene groups of two to four carbon atoms, and the R's are members of the class consisting of hydrogen and alkyl groups of not over four carbon atoms when taken individually and when taken together alkylene groups of not over three carbon atoms.

2. N,N' - dimethyl - S - cetylthiouronium pentachlorophenate.

3. S - 3,4 - dichlorobenzylthiouronium pentachlorophenate.

4. S - allylthiouronium pentachlorophenate.

5. S,S' - ethylene bis(N,N' - dimethylthiouronium pentachlorophenate.

6. S,S' - 1,4 - but - 2 - enylene bis(N,N' - ethylene - thiouronium pentachlorophenate.

No references cited.